United States Patent
Fermum et al.

(10) Patent No.: US 9,910,858 B2
(45) Date of Patent: Mar. 6, 2018

(54) SYSTEM AND METHOD FOR PROVIDING CONTEXTUAL ANALYTICS DATA

(71) Applicant: Intuit Inc., Mountain View, CA (US)

(72) Inventors: Olaf Joachim Fermum, Mountain View, CA (US); Nilendu Misra, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 301 days.

(21) Appl. No.: 14/325,978

(22) Filed: Jul. 8, 2014

(65) Prior Publication Data

US 2016/0012074 A1  Jan. 14, 2016

(51) Int. Cl.
*G06F 17/30* (2006.01)

(52) U.S. Cl.
CPC .. *G06F 17/30165* (2013.01); *G06F 17/30554* (2013.01); *G06F 17/30864* (2013.01)

(58) Field of Classification Search
CPC .................................................. G06F 11/3433
See application file for complete search history.

(56) References Cited

U.S. PATENT DOCUMENTS

| | | | | |
|---|---|---|---|---|
| 8,082,299 B2* | 12/2011 | Chess | ............... | G06F 17/30902 709/203 |
| 8,713,644 B2* | 4/2014 | Krishna | .................. | G06F 21/34 726/4 |
| 8,898,175 B2* | 11/2014 | Zenger | .............. | G06F 17/30445 707/748 |
| 8,930,818 B2* | 1/2015 | Cordasco | .............. | G06F 11/328 715/704 |
| 9,152,731 B2* | 10/2015 | Hu | .................... | G06F 17/30893 |
| 2002/0065955 A1* | 5/2002 | Gvily | ...................... | G06F 17/22 719/330 |
| 2008/0184129 A1* | 7/2008 | Cancel | .................. | G06Q 30/02 715/741 |
| 2012/0185821 A1 | 7/2012 | Yaseen et al. | | |

(Continued)

OTHER PUBLICATIONS

Ken Cochrane, How is Docker different from a normal virtual machine, Apr. 16, 2013 available at http://stackoverflow.com/questions/16047306/how-is-docker-different-from-a-normal-virtual-machine.*

(Continued)

*Primary Examiner* — Robert Beausoliel, Jr.
*Assistant Examiner* — Hau H Hoang
(74) *Attorney, Agent, or Firm* — Hawley Troxell Ennis & Hawley LLP; Philip McKay

(57) ABSTRACT

A system and method for providing contextual analytics data receives display entity data into a first virtual container, the display entity data including one or more instructions of the first virtual container. Instructions performing process operations are present within a second virtual container isolated from the first virtual container. The display entity data is analyzed to identify a webpage, for example, associated with the display entity data. If necessary, executable code is injected into the first virtual container in order to expose data of the first virtual container to the operations of the second virtual container so that further identification of the display entity may be made. A request is made by the second virtual container to one or more computing systems to provide available analytics data pertaining to the display entity data, after which the available analytics data is displayed for a user.

33 Claims, 4 Drawing Sheets

(56) References Cited

U.S. PATENT DOCUMENTS

| | | | |
|---|---|---|---|
| 2013/0152047 A1 | 6/2013 | Moorthi et al. | |
| 2013/0159394 A1* | 6/2013 | Labour | G06F 9/44526 709/203 |
| 2013/0179552 A1 | 7/2013 | Bekker et al. | |
| 2014/0137006 A1* | 5/2014 | Goodwin | G06F 3/0484 715/760 |
| 2015/0278388 A1* | 10/2015 | Markov | G06F 17/30905 715/744 |

OTHER PUBLICATIONS

C. Ames, S. Burleigh, S. Mitchell and T. Huynh, J. F. Nunamaker Jr., "Applications of Web-Based Workflow", 1998, Proceedings of the Thirty-first Annual Hawaii International Conference on Systems Sciences, vol. 1, pp. 79-87.*

David, How to make one module depend on another module artifact in maven multi-modules, Nov. 10, 2010 available at http://stackoverflow.com/questions/4150180/how-to-make-one-module-depends-on-another-module-artifact-in-maven-multi-modules.*

A fine-grained Access Control System for XML documents written by Ernesto Damiani (hereafter Damiani), ACM Transactions on Information and System Security, vol. 5, No. 2, May 2002, pp. 169-202.*

\* cited by examiner

FIG. 4

SYSTEM AND METHOD FOR PROVIDING CONTEXTUAL ANALYTICS DATA

BACKGROUND

Computing systems range from smaller single-user platforms having a single computing processor executing one or more user-level applications at a time, to enterprise-level systems having hundreds of processors or more executing large-scale application processes potentially serving thousands of users at a time.

As these computing systems have become more and more complex, determining how well a given process is functioning has become more difficult. System developers, product management teams and others who want to monitor workflows and system processes often must employ complex computing analytics-based applications which provide a great deal of information. However, the great complexity of the analytics-based application programs brings with it a necessity for a great deal of time spent by a user in the configuration and operation of the program. Launching a special program focused on analytics typically provides a user a rich feature set that is time consuming to configure properly.

For a new user of complex analytics-based computing application programs, there is often a great deal of information available on workflows and systems processes, but it is often time consuming for a new user of the complex computing application programs to develop enough expertise associated with the complex computing application programs to make efficient use of the application program and also be able to set up and operate the functionality to make sense of the voluminous data. Even veteran users of analytics-based application programs find configuration and use of such programs to be tedious.

In addition to configuration complexity, another issue that often surfaces when using such complex analytics-based application programs is in determining particular analytics data of that application program that is applicable to or otherwise associated with a particular aspect of a website or workflow the user is interested in. Typical analytics-based application programs collect a wide variety of data in many different areas, over entire servers and websites, for example. Thus, a user desiring to zero in on data applicable to a particular webpage of a web site, for example, is often forced to sift through a large amount of data before determining whether any of that data even applies to an area the user is interested in.

Further, unless the configuration of the application has been set perfectly, there is no guarantee that the large volume of data even includes analytics data of the area or webpage that the user is interested in.

It would therefore be beneficial to provide a system for providing analytics data that is lightweight and easy to use.

SUMMARY

In accordance with one embodiment, a system and method for providing contextual analytics data includes receiving webpage or workflow data at a first virtual container. In one embodiment, the webpage or workflow data includes executable instructions which are executable within the first virtual container, and further includes one or more components of non-executable webpage or workflow data.

In one embodiment, the second virtual container includes executable instructions for one or more process operations for providing contextual analytics data pertaining to data in the first container. In one embodiment, the second virtual container is isolated from the first virtual container, the isolation between the two virtual containers ensuring that executable code within the first virtual container is not executable by the second virtual container, and executable code within the second virtual container is not executable by the first virtual container. In one embodiment, the first and second virtual containers are both containers of the web browser application where program instructions may be executed. In one embodiment, the first virtual container is a web page display area of the web browser. In one embodiment, the second virtual container is a plug-in container of the web browser.

In one embodiment, a system and method for providing contextual analytics data further includes analyzing the received webpage or workflow data to determine one or more characteristics of the received data identifying the received data as being representative of a particular display or display entity. In one embodiment, a display or display entity is a single webpage of a single or multipage website. In one embodiment, a display or display entity is a single display page of a single or multipage workflow.

In one embodiment, a characteristic of the data identifying the received webpage or workflow data as being representative of a particular display entity is nondisplayable data unique to the particular display entity. For example, the nondisplayable data, in one embodiment, is a programming object holding data regarding a webpage. Furthering the example, if the webpage belongs to a web application program, such as the online version of Quickbooks™, the nondisplayable data is a data object identified as being unique to the online version of Quickbooks™, such as a data object containing the name of the application program and a version number of the particular version of the application program that generated the received webpage or workflow data.

In one embodiment, the system and method for providing contextual analytics data further includes injecting, through performance of one or more process operations of the second virtual container, one or more executable instructions into the first virtual container. In one embodiment, the injected executable instructions, when executed by the first virtual container, determine whether a particular predetermined data object is present within memory of the first virtual container. In one embodiment, if the particular predetermined data object is present within memory of the first virtual container, one or more data items of the predetermined data object are identified, and webpage identification data representative of the particular display entity, such as a webpage, is added to the first container.

In one embodiment, the system and method for providing contextual analytics data further includes capturing, prior to the analysis of the second portion, network traffic data associated with a tracking tool activated by executed first data of the first virtual container. That captured network traffic is then analyzed to identify data representative of the particular display entity. In one embodiment, the captured network traffic includes one or more data items, such as a tag, for example, representative of a particular web page of a large website.

In one embodiment, a system and method for providing contextual analytics data further includes, responsive to the analysis of the received webpage or workflow data being complete, determining that contextually relevant analytics data pertaining to the received webpage or workflow page is available from one or more sources of analytics data.

In one embodiment, contextually relevant analytics data pertaining to a display entity includes, but is not limited to, one or more data items regarding how many unique individuals have visited the particular display entity, how many individuals have completed one or more tasks associated with the display entity, how many individuals attempted to complete one or more tasks associated with the display entity, how long one or more tasks took to complete, an average length of time an individual spent viewing or operating with the display entity, customer feedback information including one or more of text, rating information, time of visit, and time when a particular customer provided feedback, average rating information derived from actual customer ratings, where a viewing customer is located, where groups of two or more viewing customers are located, any quantitative or qualitative indicator that may be presented as a number or otherwise, leading or lagging indicators of trends, resource indicators indicating one or more resources available or consumed over a predefined time period, process indicators reflecting how productive or how efficient a process is, financial indicators, and any other analytics data determined to be useful by a designer of a particular implementation of system and method for providing contextual analytics data.

In one embodiment, the available contextually relevant analytics data includes a portion of contextually relevant analytics data from a first source of analytics data, and also includes a portion of contextually relevant analytics data from a second source. In one embodiment, the first source and the second source are independent data sources not associated with each other.

In one embodiment, a system and method for providing contextual analytics data further includes displaying at least one icon associated with the contextually relevant analytics data, such as on a web browser frame, or at another appropriate location of a web browser. In one embodiment, presence of the icon indicates to a user, in one example, that contextually relevant analytics data is available for the webpage they are viewing.

In one embodiment, the icon is configured to receive an activation event from the user, such as, for example, when the user uses a computer mouse to move a cursor over the icon and then clicks a mouse button. In one embodiment, receipt of an icon activation event initiated by the user triggers the requesting of contextually relevant analytics data associated with the received webpage or workflow data.

In one embodiment, a system and method for providing contextual analytics data further includes requesting, responsive to the determination that contextually relevant analytics data pertaining to the display entity, such as the webpage or workflow page the user is viewing, is available, the available contextually relevant analytics data being associated with the received webpage or workflow data.

In one embodiment, authentication information is provided to the system and method for providing contextual analytics data. In one embodiment, the authentication information is provided prior to, or after the request is made for contextually relevant analytics data pertaining to the received webpage or workflow data. In one embodiment, the authentication information is provided with the request for contextually relevant analytics data pertaining to the received webpage or workflow data. In one embodiment, a user has to be authenticated by the system and method for providing contextual analytics data, prior to any analytics data being provided responsive to the request.

In one embodiment, the request for the contextually relevant analytics data includes user preference data indicating particular subsets of contextually relevant analytics data to be provided and displayed from a larger full set of available contextually relevant analytics data.

In one embodiment, the available contextually relevant analytics data is received responsive to the request, and at least a portion of the received contextually relevant analytics data is then displayed for the user.

In one embodiment, a user has to be authenticated by the system and method for providing contextual analytics data, prior to any analytics data being displayed for the user. In one embodiment, the received analytics data has one or more of a public portion and a private portion, and a user must be authenticated as an authorized receiver of the private portion prior to the private portion being made available to or otherwise being displayed for the user.

In one embodiment, the authentication information is a network address of a computing system being used by the user. For example, and in one embodiment, if the available contextually relevant analytics data includes a private portion requiring authentication prior to the private portion being made available or otherwise displayed for the user, and if the private portion is restricted to company employees, the system and method for providing contextual analytics data is configured to consider a user authenticated if a network address assigned to a computing system issuing the request for the contextually relevant analytics data is validated as being within a company network or otherwise under the control of a company employee.

The system for providing contextual analytics data further includes user preference data including display data preferences regarding one or more data formats preferred by the user. In one embodiment, incoming available contextually relevant analytics data received responsive to the request is converted from an original data format to a format indicated by the user preference data.

BRIEF DESCRIPTION OF THE DRAWINGS

FIG. 4 is an exemplary user interface in accordance with one embodiment.

Figure 1:
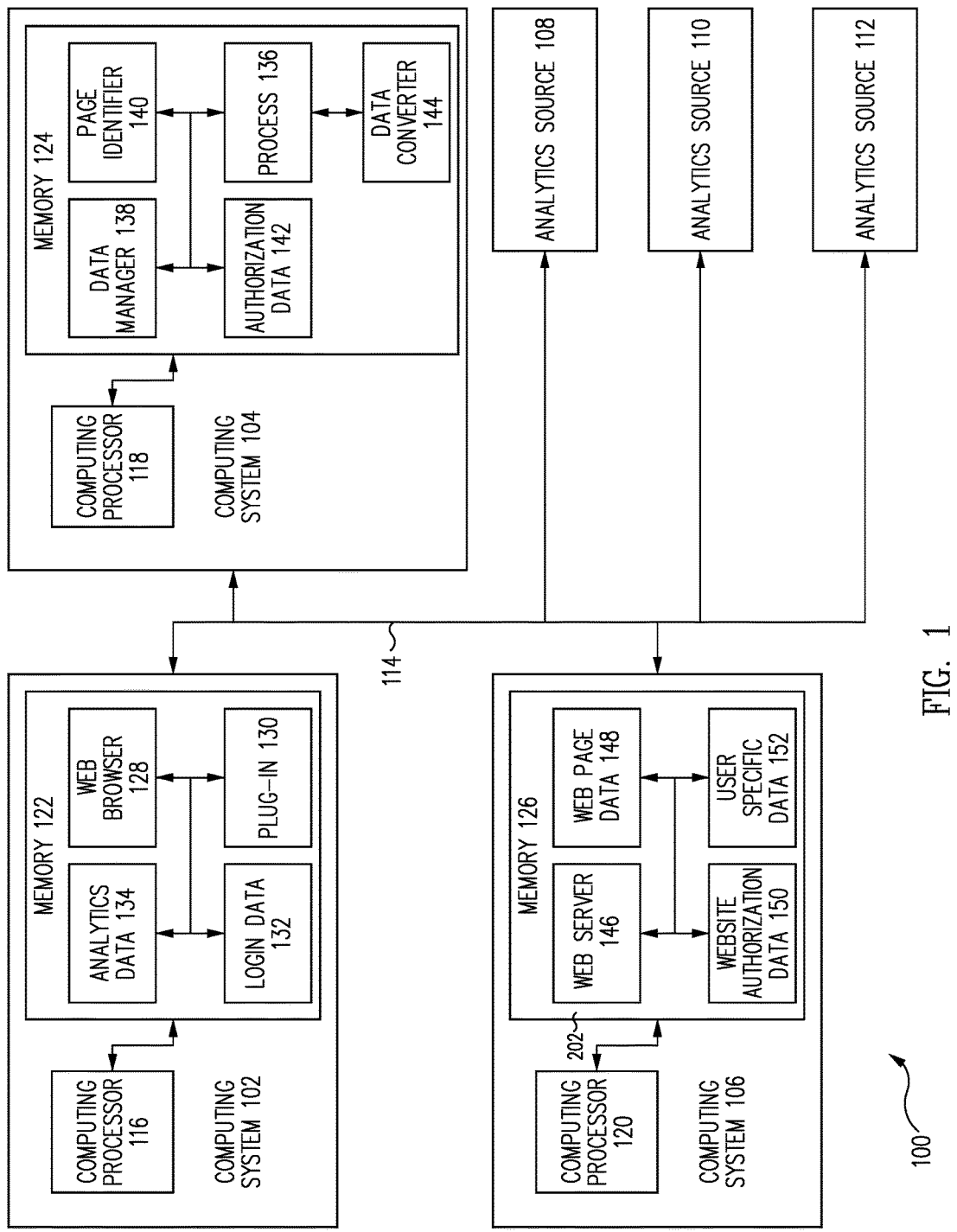
FIG. 1 is a functional block diagram showing the interaction of various elements for implementing one embodiment of a system and method for providing contextual analytics data.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a system and method for providing contextual analytics data includes a process for providing contextual analytics data implemented by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for providing contextual analytics data are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems.

In one embodiment, two or more computing systems, and/or two or more computing environments, are connected by one or more communications systems, and/or distributed computing system networks, such as, but not limited to: a public cloud; a private cloud; a virtual private cloud (VPC); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional block diagram showing the interaction of various elements for implementing one embodiment of a system and method for providing contextual analytics data.

Referring to FIG. 1, exemplary system 100 includes computing system 102, computing system 104, computing system 106, and analytics sources 108, 110, and 112, each of which are operatively coupled through communications channel 114.

Of particular note, the various elements in FIG. 1 are shown for illustrative purposes as being associated with specific computing systems, such as computing system 102, computing system 104, and computing system 106. However, the exemplary placement of the various elements within system 100 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, one or more cloud computing environments, one or more third party service capabilities, or any other computing environments or systems, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, a user in control of the one or more computing systems, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

Computing systems 102, 104, and 106 each have respective computing processors 116, 118, and 120, and associated respective memories 122, 124, and 126. Correspondingly, analytics sources 108, 110, and 112 are each associated, in one embodiment, with one or more computing processors and memories which are not shown to avoid over complicating this disclosure.

In one embodiment, memory 122 of computing system 102 includes one or more of web browser 128, plug-in 130, and login data 132. Analytics data 134 is also present within memory 122, in one embodiment, resulting from a prior or current interaction with process 136 for providing contextual analytics data of computing system 104.

In one embodiment, memory 124 of computing system 104 includes one or more of data manager 138, page identifier 140, authorization data 142, and data converter 144.

In one embodiment, memory 126 of computing system 106 includes one or more of web server 146, webpage data 148, website authorization data 150, and user specific data 152.

In one embodiment, a user of computing system 102 interacts through web browser 128 with a website of web server 146 developed using one or more of webpage data 148, and user specific data 152. In one embodiment, the website of web server 146 requires that the user of computing system 102 be authenticated as an authorized user of the website of web server 146. In one embodiment, login data 132 of computing system 102 includes at least a portion of login data of the user of computing system 102, which is compared with at least a portion of website authorization data 150. If a match exists between at least a portion of login data 132 and at least a portion of website authorization data 150, the user of computing system 102 is authenticated as an authorized user of the website of web server 146.

In one embodiment, the process 136 for providing contextual analytics data requires that the user of computing system 102 be authenticated as an authorized user of process 136 for providing contextual analytics data prior to performing any process operations regarding the providing of analytics data to a user of computing system 102. In one embodiment, analytics data received through process 136 for providing contextual analytics data has one or more of a public portion and a private portion, and a user must be authenticated as an authorized receiver of the private portion prior to the private portion being made available to or otherwise being displayed for the user.

In one embodiment, login data 132 of computing system 102 includes at least a portion of login data of the user of computing system 102, which is compared with at least a portion of authorization data 142. If a match exists between at least a portion of login data 132 and at least a portion of authorization data 142, the user of computing system 102 is authenticated as an authorized user of process 136 for providing contextual analytics data.

In one embodiment, the authentication information is a network address of a computing system, such as computing system 102, being used by the user. For example, and in one embodiment, if the available contextually relevant analytics data includes a private portion requiring authentication prior to the private portion being made available or otherwise displayed for the user, and if the private portion is restricted to company employees, the system and method for providing contextual analytics data is configured to consider a user authenticated if a network address assigned to a computing system, such as computing system 102, issuing the request for the contextually relevant analytics data is validated as being within a company network or otherwise under the control of a company employee. In one embodiment, in order to authenticate a user of computing system 102, a network address of computing system 102 is compared with a range of network addresses authorized to receive and view and/or operate on the private portion. If the compared network address is within a range specified by the range of network addresses authorized to receive and view and/or operate on the private portion, authorization is granted to the user of computing system 102 to view and/or otherwise operate on the private portion of the contextual analytics data.

In one embodiment, plug-in 130 of computing system 102 is configured to perform at least a portion of process 136 for providing contextual analytics data of computing system 104. In one embodiment, plug-in 130 of computing system 102 is configured to, for example, identify a webpage or workflow being displayed for a user of computing system 102 such as, but not limited to, a webpage of a website, a single display of a workflow, or any other entity for which analytics data may be available. In one embodiment, a webpage or workflow includes at least display data received at computing system 102 from a different computing system, such as computing system 106, for example. In one embodiment, a webpage or workflow further includes executable data received at computing system 102, such as, for example, instructions, such as instructions written in the JavaScript programming language, which are intended to be executed by web browser 128.

In one embodiment, the display data and/or executable data of the webpage or workflow received at computing system 102 is received by web browser 128 and displayed in a first virtual container of web browser 128. In one embodiment, plug-in 130 is installed in a second virtual container of web browser 128 and includes one or more instructions which may be executed by plug-in 130, in order to perform one or more process operations as discussed herein.

In one embodiment, the first virtual container and the second virtual container are isolated from each other so that executable instructions in the first virtual container may only be executed by the first virtual container, and thus may not be executed by the second virtual container, and further so that executable instructions in the second virtual container may only be executed by the second virtual container, and thus may not be executed by the first virtual container.

In one embodiment, the first and second virtual containers are both execution containers of a web browser application, such as web browser 128 of computing system 102. In one embodiment, the first virtual container is a web page display area of the web browser, such as web browser 128. In one embodiment, the second virtual container is a plug-in container of a web browser, such as web browser 128.

In one embodiment, and in one example, a system and method for providing contextual analytics data includes receiving webpage or workflow data at a first virtual container. In one embodiment, the webpage or workflow data includes executable instructions which are executable within the first virtual container, and further includes one or more components of non-executable webpage or workflow data, such as data intended to be used to create a display, or display data, such as user specific data 152 of computing system 106.

Plug-in 130, in one embodiment, interacts with page identifier 140 of computing system 104 in order to identify a webpage or workflow being displayed for a user of computing system 102. In one embodiment, plug-in 130 extracts one or more data items from a webpage or workflow, and forwards the one or more extracted data items to page identifier 140. Page identifier 140 then uses information in lookup tables and other data accessible to page identifier 140 to identify the particular webpage or workflow the user is viewing.

Web pages and workflows are typically designed using a wide variety of techniques. Some webpages and workflows have a large amount of static display information built into a structure or document object model (DOM) of the webpage downloaded when the webpage is accessed by a web browser on behalf of a user. Other web pages and workflows include a light framework available through directly downloaded webpage elements, but a large portion of the data governing what will be displayed for a user is dynamically developed at a backend server and then sent to the user's web browser, such as web browser 128 of computing system 102. Different users may see different webpage views, since the display information is dynamically developed, based on many factors.

Largely because of the many different ways to construct display information and keep track of a user's activities in webpages and workflows, the identity of a webpage or workflow page is not always readily apparent to a user.

In one embodiment, identifying a webpage includes examining one or more of the webpage's uniform resource locater (URL) and DOM to determine whether one or more identity indicators are present. In one embodiment, displayable and non-displayable data associated with the webpage is analyzed and examined to determine one or more tags, such as XML tags, HTML tags, or other tags used for constructing webpages are present within the webpage's DOM that would help in identifying the webpage or workflow associated with the particular display being provided to the user.

In one embodiment, the webpage being viewed contains one or more of a unique identifier of an image, a URL or portion of a URL, a comment line indicating an origin of the webpage, a tracking identifier associated with a third party tracking service, or any other data or metadata unique to a particular webpage or workflow display.

For some websites and online applications, the URL includes enough information to identify where the user is in the application, a particular webpage they are viewing, etc. For example, if a URL includes a pathway from the domain to the exact page a user is viewing, such as http://www.analytics.com/secondpage.html, the URL contains enough information to identify the webpage, e.g. secondpage.html, the user is viewing with a high level of confidence that the identified webpage is the webpage that the user is viewing.

In one embodiment, two or more pieces of data of the URL and/or DOM are used together to determine the identity of the webpage the user is currently viewing. For example, the domain name, e.g. http://www.analytics.com, is used together with a name or value of a tag, such as an XML or HTML tag, for example, found within the DOM, such as a tag "page" which contains the data "invoice."

In XML, the tag and data might be represented as invoice for example.

Many other combinations are possible, which are readily apparent to persons of skill in the art, while remaining within the scope of this disclosure.

In one embodiment, examining the URL and DOM doesn't conclusively provide enough details about the webpage or workflow identity, and additional information is needed in order to conclusively identify the displayed entity, e.g. webpage or workflow display, that is presently being displayed in the user's web browser, such as web browser 128. For example, some online applications allow the user to move from one screen to another without changing the base URL, e.g. http://www.analytics.com, often an entry point to the online application or workflow, to reflect that the user is viewing a different web page than the entry page.

Recall that the webpage is loaded into a first virtual container which is isolated from a second virtual container of web browser 128, and the second virtual container contains plug-in 130, for example. The first virtual container may only execute programming code that is present within the first virtual container, and the second virtual container may only execute programming code that is present within the second virtual container. Further, in one embodiment, instructions executed within the second virtual container are restricted from directly determining or otherwise directly reading the variable names and values of program variables stored within the memory of the first virtual container, and instructions executed within the first virtual container are restricted from directly determining or otherwise directly reading the variable names and values of program variables stored within the memory of the second virtual container. However, in one embodiment, instructions executed within the second container are able to change the contents of the first container, including writing additional executable instructions into the first virtual container that are either executed automatically, or are executed responsive to a trigger, such as a particular condition being satisfied.

In one embodiment, when attempting to identify the webpage, executable instructions, such as programming code represented by the JavaScript programming language, not originally present in the loaded webpage or workflow, are injected into the memory of the first virtual container. In one embodiment, plug-in 130 of the second virtual container performs the injection of the executable instructions, such as programming code represented by the JavaScript programming language, into the first virtual container.

Those of ordinary skill will readily recognize that using executable instructions represented by the JavaScript programming language is exemplary, since the JavaScript programming language is supported by many popular web browsers, such as web browser 128 of computing system 102. Those skilled persons will further readily recognize that any other type of executable instructions represented by any suitable programming language supported by the first virtual container of the given web browser the user is using may be injected into the first virtual container to perform the desired operations disclosed herein.

In one embodiment, the injected programming code includes instructions which when executed within the first container, will determine whether one or more programming objects, such as one or more main variables, object variables or other data or function names, for example, are present in memory associated with the first virtual container. Those of ordinary skill will readily appreciate that programming objects are typically created to hold data and to provide related functions and methods that may be accessed and used.

If a determination is made that data of the one or more programming objects is present in memory, the injected instructions, in one embodiment, analyze the programming objects containing information which, standing alone or in combination with other information already accessible to process 136 for providing contextual analytics data, may be used to identify the webpage or workflow being displayed for the user.

If data of the one or more programming objects present in the memory of the first virtual container may be used to identify the webpage or workflow being displayed for the user, further ones of the injected instructions modifies the DOM of the displayed entity, such as a webpage or a workflow page, to make data representative of the one or more programming objects readable by executable instructions of the second virtual container. In one embodiment, if data of the one or more programming objects present in the memory of the first virtual container may be used to identify the webpage or workflow being displayed for the user, further ones of the injected instructions modifies the DOM of the displayed entity to reflect a value of the associated programming object. In one embodiment, the injected executable instructions insert one or more data attributes into the DOM of the displayed webpage of the first virtual container, such as inserting a comment line or other attribute so that the new attribute may be read by the plug-in, such as plug-in 130, and a further identification of the webpage or workflow of the first virtual container may be made or enhanced.

Objects, such as JavaScript objects, are isolated memory spaces having one or more of data, properties and methods. By searching memory associated with the first virtual container for certain objects, identification of the workflow page, webpage, or website may be made.

For example, in one embodiment, assume that an authenticated user is using their web browser to interface with an online application, such as Quickbooks™ Online, available from Intuit Inc. of Mountain View, Calif. Further assume that the online application or workflow causes an online application JavaScript object to be loaded into the user's web browser whenever the user is viewing a webpage associated with the online application. By examining memory of the first virtual container and locating a known object that the particular online application uses, at least a partial identification of the particular webpage or location in the particular workflow may be made.

As discussed above, in one embodiment, two or more pieces of data of the URL and/or DOM are used together to determine the identity of the webpage the user is currently viewing. Correspondingly, two or more pieces of data of the URL, DOM, and JavaScript variables of the first virtual container are used together, in one embodiment, to determine the identity of the webpage the user is currently viewing.

For example, the domain name, e.g. http://www.analytics.com, is used together with a name and/or value of a programming variable, such as a JavaScript variable, found within the memory of the first virtual container, such as a JavaScript variable "page" which represents the data "invoice." Many other combinations are possible, which are readily apparent to persons of skill in the art, while remaining within the scope of this disclosure.

In one embodiment, plug-in 130 of web browser 128 works together with page identifier 140 to identify a display entity, such as a webpage or workflow page. In one embodiment, following a determination of a URL or other data associated with the domain name associated with the webpage or workflow, plug-in 130 sends the domain name data to page identifier 140. Page identifier 140 then reviews available analytics data, such as a list of analytics data in a lookup table, and determines, in this example, in one embodiment, that there is only one known set of analytics data available for a website having that domain name, with that set of analytics data being focused entirely on the domain, and not divided into separate analytics data sets according to particular web pages or workflow pages. In this example, plug-in 130 provides page identifier 140 the domain name data and page identifier 140 determines that there is only one set of analytics data for the entire domain, after which plug-in 130 is provided an indication that no further data is needed by page identifier 140, due to page identifier 140 having enough information to conclusively identify the domain name as being associated with the particular identified set of analytics data.

In a second example, in one embodiment, following a determination of a URL or other data associated with the domain name associated with the webpage or workflow, plug-in 130 sends the domain name data to page identifier 140. Page identifier 140 then reviews available analytics data, such as a list of analytics data in a lookup table, and determines, in this example, in one embodiment, that there are two or more different known sets of analytics data available for a website having that domain name, and the two different known sets of analytics data apply to different webpages associated with that domain name.

Thus, responsive to an indication from page identifier 140 that additional identification indicators are needed to conclusively identify the display entity that the user is viewing—such as the webpage or workflow page, or alternatively responsive to a lack of confirmation, after a predetermined period of time passes, by page identifier 140 that no further data is needed, plug-in 130 attempts to gather additional information regarding the particular display entity, such as a particular webpage or workflow page being viewed by the user, such as using the injection process discussed above.

In one embodiment, plug-in 130 includes some or all of the page identification logic described above as being in page identifier 140. In this embodiment, plug-in 130 determines whether a given domain can be further decomposed into pages and/or workflows. In one embodiment, plug-in 130 gathers all necessary info and sends it to page identifier 140 along with a request for analytics data.

In one embodiment, determining an identity of a display entity the user is viewing further includes capturing network traffic data associated with a tracking tool activated by data of the first virtual container. That captured network traffic is then analyzed to identify data representative of the particular display entity. In one embodiment, the captured network traffic includes one or more data items, such as a tag, for example, representative of a particular web page of a large website.

In one embodiment, a system and method for providing contextual analytics data further includes, responsive to the analysis of the received webpage or workflow data being complete and thus that an appropriate display entity has been identified which is representative of the display entity that the user is viewing, determining that contextually relevant analytics data pertaining to the identified webpage or workflow is available from one or more sources of analytics data, such as one or more of analytics sources 108, 110, and 112. The available analytics data is, in one embodiment, in one or more data formats, such as one or more of textual data, video data, image data, table data, or any other data format known to those of ordinary skill or later developed. In one embodiment, data from a first source, such as analytics source 108, is available in a first data format, and data from a second source, such as analytics source 110, is available in a second data format different from the first data format. In one embodiment, a first portion of data from a first source, such as analytics source 108, is available in a first data format, a second portion of data from the same first source, such as analytics source 108, is available in a second data format.

In one embodiment, the available contextually relevant analytics data includes a portion of contextually relevant analytics data from a first source of analytics data, and also includes a portion of contextually relevant analytics data from a second source. In one embodiment, the first source and the second source are independent data sources not associated with each other.

In one embodiment, a system and method for providing contextual analytics data further includes displaying at least one icon associated with the contextually relevant analytics data, such as within a web browser frame, or at another appropriate location of a web browser, such as web browser 128. In one embodiment, presence of the icon indicates to a user, in one example, that contextually relevant analytics data is available for the webpage they are viewing. In one embodiment, the icon is presented using different coloration based on a status reflected by the available analytics data.

In one embodiment, the icon is configured to receive an activation event from the user, such as, for example, when the user uses a computer mouse to move a cursor over the icon and then clicks a mouse button or when the user moves a mouse cursor over the icon. In one embodiment, receipt of an icon activation event initiated by the user triggers the requesting of contextually relevant analytics data associated with the received webpage or workflow data, the request being issued by a component of computing system 102, for example, such as plug-in 130.

In one embodiment, available analytics data is fetched responsive to plug-in 130 detecting user input requesting that a particular web page be retrieved and loaded. In this embodiment, receipt of an icon activation event triggers the display of already-available analytics data.

In one embodiment, a system and method for providing contextual analytics data further includes requesting, responsive to the determination that contextually relevant analytics data pertaining to the received webpage or workflow data is available, the available contextually relevant analytics data associated with the received webpage or workflow data.

In one embodiment, authentication information is provided to the system and method for providing contextual analytics data. In one embodiment, the authentication information is provided prior to, or after the request is made for contextually relevant analytics data pertaining to the received webpage or workflow data. In one embodiment, the authentication information is provided with the request for contextually relevant analytics data pertaining to the received webpage or workflow data. In one embodiment, a user has to be authenticated by the system and method for providing contextual analytics data, prior to a private portion of analytics data being provided responsive to the request.

In one embodiment, the request for the contextually relevant analytics data, issued by plug-in 130, for example, includes user preference data indicating particular subsets of contextually relevant analytics data to be provided and displayed from a larger full set of available contextually relevant analytics data. In this example, if there are three sets or portions of analytics data available for the display entity being viewed by the user, the user preference data indicates, for example, that the user prefers to only view a particular first portion of the analytics data, or only a particular second portion of the analytics data, or a combination of a first and third portions of the analytics data.

In one embodiment, the available contextually relevant analytics data is received responsive to the request, and at least a portion of the received contextually relevant analytics data is then displayed for the user.

Recall that, in one embodiment, a user has to be authenticated by the system and method for providing contextual analytics data, prior to any analytics data being displayed for the user. In one embodiment, the received analytics data has one or more of a public portion and a private portion, and a user must be authenticated as an authorized receiver of the private portion prior to the private portion being made available to or otherwise being displayed for the user.

The system for providing contextual analytics data further includes user preference data including display data preferences regarding one or more data formats preferred by the user. In one embodiment, the display data preferences indicate that data provided by a first source of analytics data, such as analytics source 108, should be provided in a first data format and data provided by a second source of analytics data, such as analytics source 110, should be provided in a second data format. User preference data includes, in one embodiment, data indicating which portions of which kinds of data a user prefers. For example, the user preference data associated with a given user may indicate that the user likes to see the first two columns of data from a ten-column table from a first analytics data source, such as analytics source 108. Other variations are possible while remaining within the scope of this disclosure.

In one embodiment, incoming available contextually relevant analytics data received responsive to the request is converted by a data converter such as data converter 144, from an original data format available from the analytics source, such as analytics source 108, to a different preferred format indicated by the user preference data.

Data manager 138 is provided to coordinate the details of receiving data in one or more analytics source data formats, determining whether the received data is in the proper format, and converting the received data as needed.

Using the system and method for providing contextual analytics data discussed above, automatic identification of a display entity a user is viewing results in a request for available analytics data, with a visual indication being provided to the user to indicate the presence of the analytics data for a product manager, for example, or a software developer, customer service professional, or anyone else who desires to understand a status of a system, process, or workflow.

Consequently, using the system and method for providing contextual analytics data discussed herein, analytics data pertaining directly to a display entity being viewed by a user is automatically, and transparently, provided in an efficient and effective manner.

Figure 2:
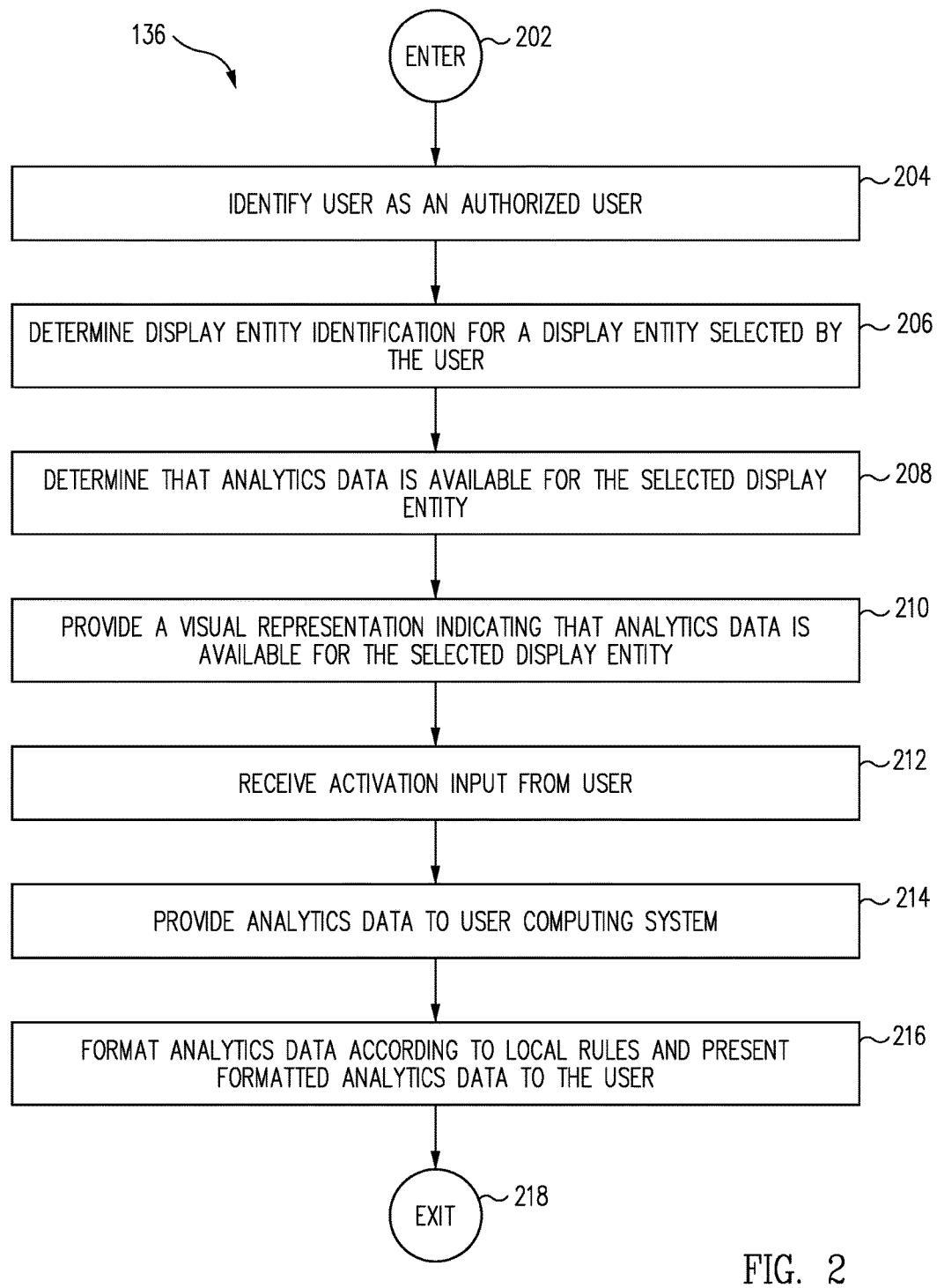
FIG. 2 is an exemplary flowchart depicting a process for providing contextual analytics data in accordance with one embodiment.

FIG. 2 is an exemplary flowchart depicting a process for providing contextual analytics data in accordance with one embodiment.

In one embodiment, a user of computing system 102 interacts through web browser 128 with a website of web server 146 developed using one or more of webpage data 148, and user specific data 152.

Referring to FIG. 1 and FIG. 2 together, process 136 for providing contextual analytics data begins at ENTER OPERATION 202 and proceeds with IDENTIFY USER AS AN AUTHORIZED USER OPERATION 204. In one embodiment, at IDENTIFY USER AS AN AUTHORIZED USER OPERATION 204, a user of process 136 for providing contextual analytics data is required to be authenticated as an authorized user of either or both of process 136 for providing contextual analytics data and a website of web server 146 developed using one or more of webpage data 148, and user specific data 152.

In one embodiment, at IDENTIFY USER AS AN AUTHORIZED USER OPERATION 204, the website of web server 146 requires that the user of computing system 102 be authenticated as an authorized user of the website of web server 146 prior to a display entity associated with a webpage or workflow page of a website of web server 146 being displayed for the user. In one embodiment, at IDENTIFY USER AS AN AUTHORIZED USER OPERATION 204, login data 132 of computing system 102 includes at least a portion of login data of the user of computing system 102, which is provided to computing system 106, and is compared with at least a portion of website authorization data 150. If, at IDENTIFY USER AS AN AUTHORIZED USER OPERATION 204, a match exists between at least a portion of login data 132 and at least a portion of website authorization data 150, the user of computing system 102 is authenticated, at IDENTIFY USER AS AN AUTHORIZED USER OPERATION 204, as an authorized user of the web site of web server 146.

In one embodiment, the process 136 for providing contextual analytics data requires that the user of computing system 102 be authenticated as an authorized user of process 136 for providing contextual analytics data prior to performing any process operations regarding the providing of analytics data to a user of computing system 102. In one embodiment, as an example, analytics data received through process 136 for providing contextual analytics data has one or more of a public portion and a private portion, and a user must be authenticated, at IDENTIFY USER AS AN AUTHORIZED USER OPERATION 204, as an authorized receiver of the private portion prior to the private portion being made available to or otherwise being displayed for the user.

In one embodiment, login data 132 of computing system 102 includes at least a portion of login data of the user of computing system 102 which is compared, at IDENTIFY USER AS AN AUTHORIZED USER OPERATION 204, with at least a portion of authorization data 142. If, at IDENTIFY USER AS AN AUTHORIZED USER OPERATION 204, a match exists between at least a portion of login data 132 and at least a portion of authorization data 142, the user of computing system 102 is authenticated as an authorized user of process 136 for providing contextual analytics data.

In one embodiment, the authentication information is a network address of a computing system, such as computing system 102, being used by the user. For example, and in one embodiment, if the available contextually relevant analytics data includes a private portion requiring authentication prior to the private portion being made available or otherwise displayed for the user, if the private portion is restricted to company employees, the system and method for providing contextual analytics data is configured to consider a user authenticated, at IDENTIFY USER AS AN AUTHORIZED USER OPERATION 204, if a network address assigned to a computing system issuing the request for the contextually relevant analytics data, such as computing system 102, is validated as being within a company network or otherwise under the control of a company employee. In one embodiment, in order to authenticate a user of computing system 102, a network address of computing system 102 is compared, at IDENTIFY USER AS AN AUTHORIZED USER OPERATION 204, with a range of network addresses authorized to receive and view and/or operate on the private portion. If the compared network address is within a range specified by the range of network addresses authorized to receive and view and/or operate on the private portion, authorization is granted, at IDENTIFY USER AS AN AUTHORIZED USER OPERATION 204, to the user of computing system 102 to view and/or otherwise operate on the private portion of the contextual analytics data.

In one embodiment, at IDENTIFY USER AS AN AUTHORIZED USER OPERATION 204, following authentication of the user as an authorized user of a website of web server 146, and/or as an authorized user of process 136 for providing contextual analytics data of computing system 104, process flow proceeds with DETERMINE DISPLAY ENTITY IDENTIFICATION FOR A DISPLAY ENTITY SELECTED BY THE USER OPERATION 206.

In one embodiment, at DETERMINE DISPLAY ENTITY IDENTIFICATION FOR A DISPLAY ENTITY SELECTED BY THE USER OPERATION 206, plug-in 130 of computing system 102 is configured to perform at least a portion of process 136 for providing contextual analytics data of computing system 104. In one embodiment, plug-in 130 of computing system 102 is configured to, for example, identify, at DETERMINE DISPLAY ENTITY IDENTIFICATION FOR A DISPLAY ENTITY SELECTED BY THE USER OPERATION 206, a display entity selected by a user of computing system 102 such as, but not limited to, a webpage of a website such as a website provided by web server 146 of computing system 106, a single display of a workflow, or any other display entity for which analytics data may be available. In one embodiment, a webpage or workflow includes at least display data received at computing system 102 from a different computing system, such as computing system 106, for example. In one embodiment, a webpage or workflow further includes executable data received at computing system 102, such as, for example, instructions, such as instructions written in the JavaScript programming language, which are intended to be executed by web browser 128.

In one embodiment, at DETERMINE DISPLAY ENTITY IDENTIFICATION FOR A DISPLAY ENTITY SELECTED BY THE USER OPERATION 206, the display data and/or executable data of the webpage or workflow received at computing system 102 is received by web browser 128 and displayed in a first virtual container of web browser 128. In one embodiment, at DETERMINE DISPLAY ENTITY IDENTIFICATION FOR A DISPLAY ENTITY SELECTED BY THE USER OPERATION 206, plug-in 130 is installed in a second virtual container of web browser 128 and includes one or more instructions which may be executed by plug-in 130, in order to perform one or more process operations as discussed herein. A detailed discussion of the process operations associated with DETERMINE DISPLAY ENTITY IDENTIFICATION FOR A DISPLAY ENTITY SELECTED BY THE USER OPERATION 206 will be presented below, with the discussion of FIG. 3.

In one embodiment, the first virtual container and the second virtual container are isolated from each other so that executable instructions in the first virtual container may only be executed by the first virtual container, and thus may not be executed by the second virtual container, and further so that executable instructions in the second virtual container may only be executed by the second virtual container, and thus may not be executed by the first virtual container.

In one embodiment, the first and second virtual containers are both execution containers of a web browser application, such as web browser 128 of computing system 102. In one embodiment, the first virtual container is a web page display area of the web browser, such as web browser 128. In one embodiment, the second virtual container is a plug-in container of a web browser, such as web browser 128.

In one embodiment, at DETERMINE DISPLAY ENTITY IDENTIFICATION FOR A DISPLAY ENTITY SELECTED BY THE USER OPERATION 206, and in an example, a system and method for providing contextual analytics data includes receiving webpage or workflow data at a first virtual container. In one embodiment, the webpage or workflow data includes executable instructions which are executable within the first virtual container, and further includes one or more components of non-executable webpage or workflow data, such as data intended to be used to create a display, or display data, such as user-specific data 152 of computing system 106.

Plug-in 130, in one embodiment, interacts, at DETERMINE DISPLAY ENTITY IDENTIFICATION FOR A DISPLAY ENTITY SELECTED BY THE USER OPERATION 206, with page identifier 140 of computing system 104 in order to identify a webpage or workflow being displayed for a user of computing system 102. In one embodiment, at DETERMINE DISPLAY ENTITY IDENTIFICATION FOR A DISPLAY ENTITY SELECTED BY THE USER OPERATION 206, plug-in 130 extracts one or more data items from a webpage or workflow, and forwards the one or more extracted data items to page identifier 140. Page identifier 140 then uses information in lookup tables and other data accessible to page identifier 140 to identify the particular webpage or workflow the user is viewing.

In one embodiment, at DETERMINE DISPLAY ENTITY IDENTIFICATION FOR A DISPLAY ENTITY SELECTED BY THE USER OPERATION 206, responsive to the analysis of the received webpage or workflow data being complete and thus verifying that an appropriate display entity has been identified which is representative of the display entity that the user is viewing, process flow proceeds with DETERMINE THAT ANALYTICS DATA IS AVAILABLE FOR THE SELECTED DISPLAY ENTITY OPERATION 208.

In one embodiment, at DETERMINE THAT ANALYTICS DATA IS AVAILABLE FOR THE SELECTED DISPLAY ENTITY OPERATION 208, a determination is made that contextually relevant analytics data pertaining to the identified webpage or workflow is available from one or more sources of analytics data, such as one or more of analytics sources 108, 110, and 112. The available analytics data is, in one embodiment, in one or more data formats, such as one or more of textual data, video data, image data, table data, or any other data format known to those of ordinary skill or later developed. In one embodiment, data from a first source, such as analytics source 108, is available in a first data format, and data from a second source, such as analytics source 110, is available in a second data format different from the first data format. In one embodiment, a first portion of data from a first source, such as analytics source 108, is available in a first data format, a second portion of data from the same first source, such as analytics source 108, is available in a second data format.

In one embodiment, the available contextually relevant analytics data includes a portion of contextually relevant analytics data from a first source of analytics data, and also includes a portion of contextually relevant analytics data from a second source. In one embodiment, the first source and the second source are independent data sources not associated with each other.

In one embodiment, at DETERMINE THAT ANALYTICS DATA IS AVAILABLE FOR THE SELECTED DISPLAY ENTITY OPERATION 208, a system and method for providing contextual analytics data further includes displaying at least one icon associated with the contextually relevant analytics data, such as within a web browser frame, or at another appropriate location of a web browser, such as web browser 128.

Figure 4:
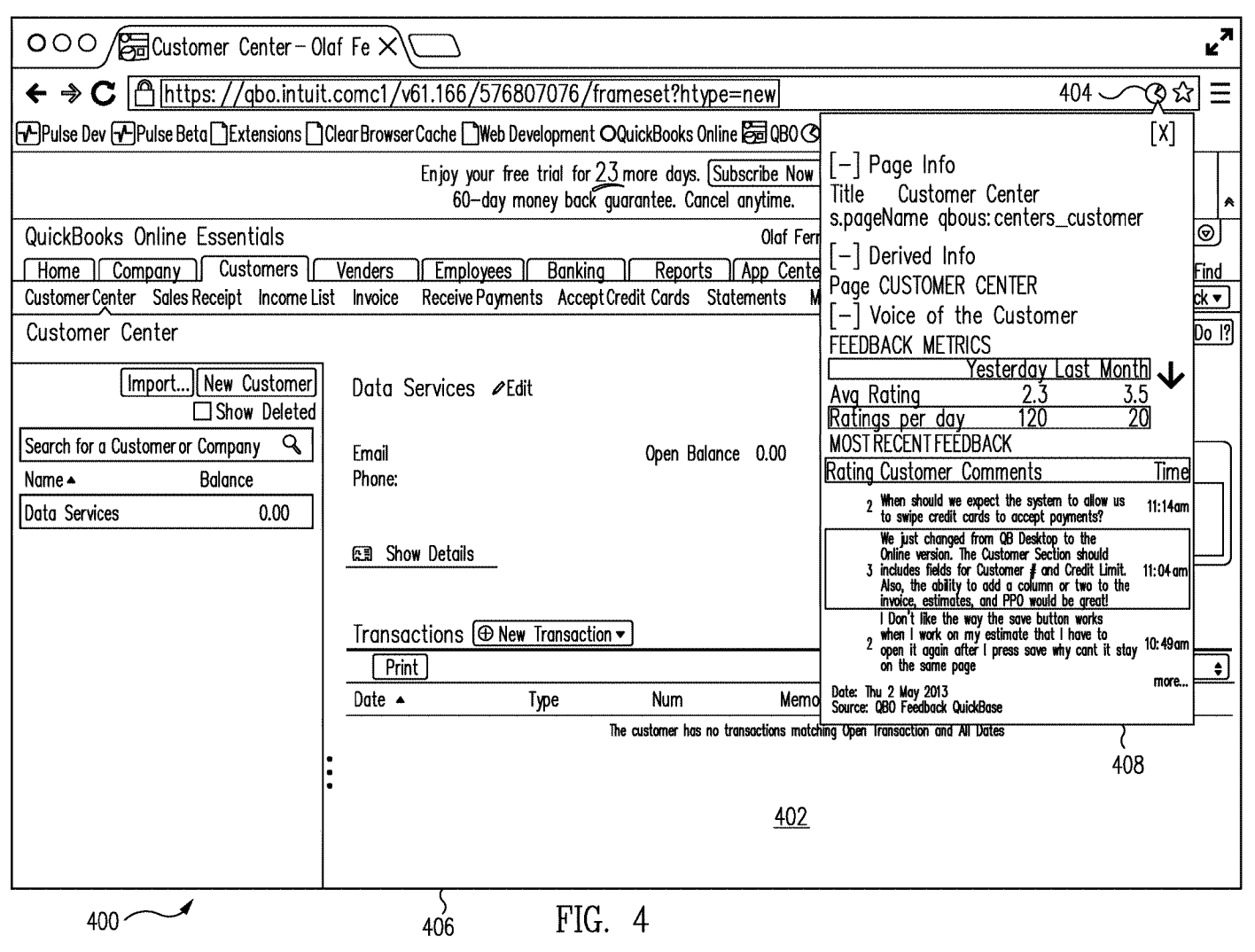

FIG. 4 is an exemplary user interface in accordance with one embodiment.

Referring to FIG. 1, FIG. 2, and FIG. 4 together, in one embodiment, user interface 400 includes a display area 402 suitable for displaying data of a display entity, such as a webpage of web server 146. Following a determination at DETERMINE THAT ANALYTICS DATA IS AVAILABLE FOR THE SELECTED DISPLAY ENTITY OPERATION 208 that contextually relevant analytics data pertaining to the identified webpage or workflow is available from one or more sources of analytics data, process flow proceeds with PROVIDE A VISUAL REPRESENTATION INDICATING THAT ANALYTICS DATA IS AVAILABLE FOR THE SELECTED DISPLAY ENTITY OPERATION 210.

In one embodiment, at PROVIDE A VISUAL REPRESENTATION INDICATING THAT ANALYTICS DATA IS AVAILABLE FOR THE SELECTED DISPLAY ENTITY OPERATION 210, icon 404 is presented within frame 406 of display area 402. In one example, and in one embodiment, presence of the icon indicates to a user, in one example, that contextually relevant analytics data is available for the display entity they are viewing, such as for a webpage or workflow page that are viewing.

In one embodiment, at PROVIDE A VISUAL REPRESENTATION INDICATING THAT ANALYTICS DATA IS AVAILABLE FOR THE SELECTED DISPLAY ENTITY OPERATION 210, the visual representation, such as icon 404, is presented using coloration based on a status reflected by the available analytics data. For example, if the analytics data available from a first analytics source, such as analytics source 108, includes customer review data such as one or more ratings of the display entity or a web application associated with the display entity, in one embodiment, the analytics data available from the first analytics source is analyzed to determine an average rating provided by one or more customers. In one embodiment, a determination of an average rating provided by one or more customers includes ratings over a predetermined recent time period, such as for example, the most recent 24 hour period, the most recent 48 hour period, the most recent week, or any other predetermined recent time period desired by a designer of a particular implementation of the system and method for providing contextual analytics data disclosed herein. In one embodiment, numerical data available from multiple analytics sources, such as analytics sources 108 and 110, for example, are averaged together in order to determine a status.

In one embodiment, if the average rating is above a predetermined acceptable threshold, the visual representation, such as icon 404, is displayed, at PROVIDE A VISUAL REPRESENTATION INDICATING THAT ANALYTICS DATA IS AVAILABLE FOR THE SELECTED DISPLAY ENTITY OPERATION 210, in a first color, such as green. In one embodiment, if the average rating is between the predetermined acceptable threshold and a predetermined unacceptable threshold, the visual representation, such as icon 404, is displayed, at PROVIDE A VISUAL REPRESENTATION INDICATING THAT ANALYTICS DATA IS AVAILABLE FOR THE SELECTED DISPLAY ENTITY OPERATION 210, in a second color, such as yellow. In one embodiment, if the average rating is below a predetermined unacceptable threshold, the visual representation, such as icon 404, is displayed, at PROVIDE A VISUAL REPRESENTATION INDICATING THAT ANALYTICS DATA IS AVAILABLE FOR THE SELECTED DISPLAY ENTITY OPERATION 210, in a third color, such as red. Additional, or fewer, colors and thresholds may be used to create and/or present the visual representation, such as icon 404, while remaining within the scope of this disclosure.

In one embodiment, the determination of the color that the visual representation, such as icon 404, represents is at least partly based on how many ratings per day the display entity is associated with, and/or whether a rating trend is positive or negative. In one example, if the predetermined recent time period over which an average rating is determined is 24 hours, or if recent ratings within the 24-hour period are higher than earlier ratings within the same 24-hour period, or, are alternatively higher than ratings provided in the prior 24-hour time period, a determination is made, at PROVIDE A VISUAL REPRESENTATION INDICATING THAT ANALYTICS DATA IS AVAILABLE FOR THE SELECTED DISPLAY ENTITY OPERATION 210, that a rating trend associated with that display entity is trending upwards. In one embodiment, the visual representation, such as icon 404, coloration is representative of a current status and a trend, for example, with the visual representation, such as icon 404, being represented by two colors, a first color for the current status, and a second color representative of the trend direction.

In one embodiment, for example, if a current status represented by an average rating is yellow, but the rating trend associated with the display entity is trending upwards, the visual representation coloration is represented using two colors, a first color of yellow representing the current status, and the second color of green representing the upward rating trend. Other symbology may be used to reflect a status and a current trend in the presentation of the visual representation, such as icon 404, as desired by a designer of a particular implementation of the system and method for providing contextual analytics data disclosed herein.

In one embodiment, if the display entity is trending downwards, a rating trend coloration for the visual representation provided at PROVIDE A VISUAL REPRESENTATION INDICATING THAT ANALYTICS DATA IS AVAILABLE FOR THE SELECTED DISPLAY ENTITY OPERATION 210, such as icon 404, is red. In one embodiment, coloration of the visual representation, such as icon 404, is at least partly based on how sharp the rating trend is, such as how steep the slope is of the rating trend. For example, if the current rating trend is downward and the status is green, the rating trend coloration is yellow, and thus at least a portion of the visual representation, such as icon 404, is yellow. If, on the other hand, and in another example, the current rating trend is downward and the status is green, the rating trend coloration is red if the trend is sharp as compared with a predetermined rating trend threshold. In one embodiment, the predetermined trend threshold represents the slope of a line representing the current rating trend.

Following a visual representation being provided, at PROVIDE A VISUAL REPRESENTATION INDICATING THAT ANALYTICS DATA IS AVAILABLE FOR THE SELECTED DISPLAY ENTITY OPERATION 210, process flow proceeds with RECEIVE ACTIVATION INPUT FROM USER OPERATION 212.

In one embodiment, at RECEIVE ACTIVATION INPUT FROM USER OPERATION 212, the visual representation, such as icon 404, is configured to receive an activation event from the user, such as, for example, when the user uses a computer mouse to move a cursor over the visual representation, such as icon 404, and then clicks a mouse button, or when the user moves a mouse cursor over the visual representation, such as icon 404.

In one embodiment, receipt of a visual representation activation event initiated by the user, at RECEIVE ACTIVATION INPUT FROM USER OPERATION 212, triggers the requesting or display of contextually relevant analytics data associated with the display entity, such as a webpage or workflow page, the request being issued by a component of computing system 102, for example, such as plug-in 130.

In one embodiment, receipt of a visual representation activation event, at RECEIVE ACTIVATION INPUT FROM USER OPERATION 212, where the visual representation, such as icon 404, is configured only to indicate to the user that analytics data is available, and is not necessarily configured, for example, to indicate a status or a rating or other trend associated with the available analytics data. In this example, the available analytics data may not yet have been retrieved from the one or more analytics sources, such as one or more of analytics sources 108, 110, and 112. In this example, receipt of a visual representation activation event, at RECEIVE ACTIVATION INPUT FROM USER OPERATION 212, initiates a request by computing system 102 to computing system 106 for available analytics data to be retrieved from the one or more analytics sources, such as one or more of analytics sources 108, 110, and 112.

In one embodiment, following the receipt of an activation input or event from the user, at RECEIVE ACTIVATION INPUT FROM USER OPERATION 212, process flow proceeds with PROVIDE ANALYTICS DATA TO USER COMPUTING SYSTEM OPERATION 214.

In one embodiment, at PROVIDE ANALYTICS DATA TO USER COMPUTING SYSTEM OPERATION 214, responsive to the request by computing system 102 to computing system 106, at least a portion of the available analytics data is retrieved, formatted or converted as discussed herein, and displayed for the user. In one embodiment, the display provided to the user is a pop-up window, such as pop-up window 408.

In one embodiment, if a user of computing system 102 has not previously been authenticated or identified as an authorized user of computing system 106, such as at IDENTIFY USER AS AN AUTHORIZED USER OPERATION 204 of FIG. 2, authentication information of the user of computing system 102, if required, is provided to the system and method for providing contextual analytics data so that the user of computing system 102 may be authenticated as an authorized user of process 136 for providing contextual analytics data, prior to receiving any of the available analytics data.

In one embodiment, the authentication information is provided prior to, or after the request is made for contextually relevant analytics data pertaining to the display entity, such as a received webpage or workflow page. In one embodiment, the authentication information is provided with the request for contextually relevant analytics data pertaining to the received webpage or workflow data. In one embodiment, a user has to be authenticated by the system and method for providing contextual analytics data, prior to a private portion of analytics data being provided responsive to the request.

In one embodiment, the request for the contextually relevant analytics data provided, for example, at RECEIVE ACTIVATION INPUT FROM USER OPERATION 212, issued by plug-in 130, for example, includes user preference data indicating particular subsets of contextually relevant analytics data to be provided and displayed from a larger full set of available contextually relevant analytics data. In this example, if there are three sets or portions of analytics data available for the display entity being viewed by the user, the user preference data indicates, for example, that the user prefers to only view a particular first portion of the analytics data, or only a particular second portion of the analytics data, or a combination of a first and third portions of the analytics data.

In one embodiment, at PROVIDE ANALYTICS DATA TO USER COMPUTING SYSTEM OPERATION 214, at least a portion of the available contextually relevant analytics data is received responsive to the request, and at least a portion of the received contextually relevant analytics data is then displayed for the user. In one embodiment, at PROVIDE ANALYTICS DATA TO USER COMPUTING SYSTEM OPERATION 214, only a portion of the available analytics data is provided by the one or more analytics sources, such as analytics sources 108, 110, and 112, with the provided portion of the available analytics data being determined according to user preference data provided with the request. In one embodiment, at least a portion of the available analytics data available at analytics sources, such as analytics sources 108, 110, and 112, is provided to data manager 138 of computing system 104 and then only a subset of that provided analytics data is forwarded onto computing system 102, based on the user preference data.

Recall that, in one embodiment, a user has to be authenticated by the system and method for providing contextual analytics data, prior to any analytics data being displayed for the user. In one embodiment, the received analytics data has one or more of a public portion and a private portion, and a user must be authenticated as an authorized receiver of the private portion prior to the private portion being made available to or otherwise being displayed for the user.

In one embodiment, following the providing of analytics data to user computing system 102, for example at PROVIDE ANALYTICS DATA TO USER COMPUTING SYSTEM OPERATION 214, process flow proceeds with FORMAT ANALYTICS DATA ACCORDING TO LOCAL RULES AND PRESENT FORMATTED ANALYTICS DATA TO THE USER OPERATION 216.

In one embodiment, the system for providing contextual analytics data includes user preference data regarding display data preferences indicating one or more data formats or arrangements of data preferred by the user.

In one embodiment, the display data preferences indicate that data provided by a first source of analytics data, such as analytics source 108, should be provided in a first data format, and data provided by a second source of analytics data, such as analytics source 110, should be provided in a second data format. User preference data includes, in one embodiment, data indicating which portions of which kinds of data a user prefers.

In one embodiment, at FORMAT ANALYTICS DATA ACCORDING TO LOCAL RULES AND PRESENT FORMATTED ANALYTICS DATA TO THE USER OPERATION 216, the provided analytics data is refined, formatted, and trimmed to accommodate the requirements of the display data preferences of the user, and/or of plug-in 130. In one embodiment, the user preference data associated with a given user may indicate that the user indicates a preference to see only the first two columns of data from a ten-column table from a first analytics data source, such as analytics source 108. In one embodiment, and in the example above, the provided analytics data is trimmed, at FORMAT ANALYTICS DATA ACCORDING TO LOCAL RULES AND PRESENT FORMATTED ANALYTICS DATA TO THE USER OPERATION 216, from a 10 column table to a two column table, according to the user preference data.

In one embodiment, incoming available contextually relevant analytics data received responsive to the request is converted, at FORMAT ANALYTICS DATA ACCORDING TO LOCAL RULES AND PRESENT FORMATTED ANALYTICS DATA TO THE USER OPERATION 216, by a data converter such as data converter 144, from an original data format available from the analytics source, such as analytics source 108, to a different preferred format indicated by the user preference data.

Data manager 138 is provided to coordinate the details of receiving data in one or more analytics source data formats, determining whether the received data is in the proper format, and converting the received data, at FORMAT ANALYTICS DATA ACCORDING TO LOCAL RULES AND PRESENT FORMATTED ANALYTICS DATA TO THE USER OPERATION 216, as needed.

Following completion of FORMAT ANALYTICS DATA ACCORDING TO LOCAL RULES AND PRESENT FORMATTED ANALYTICS DATA TO THE USER OPERATION 216, process flow proceeds with EXIT OPERATION 218 after which process 136 for providing contextual analytics data ends, awaiting new data.

Using the system and method for providing contextual analytics data discussed above, automatic identification of a display entity a user is viewing results in a request for available analytics data, with a visual indication being provided to the user to indicate the presence of the analytics data for a product manager, for example, or a software developer, customer service professional, or anyone else who desires to understand a status of a system, process, or workflow.

Consequently, using the system and method for providing contextual analytics data discussed herein, analytics data pertaining directly to a display entity being viewed by a user is automatically, and transparently, provided in an efficient and effective manner.

Recall that, at DETERMINE DISPLAY ENTITY IDENTIFICATION FOR A DISPLAY ENTITY SELECTED BY THE USER OPERATION 206, an identification is made of the display entity the user was viewing, such as a webpage or workflow page, in order to later determine whether analytics data existed for the display entity, and then to format and display the available analytics data.

Figure 3:
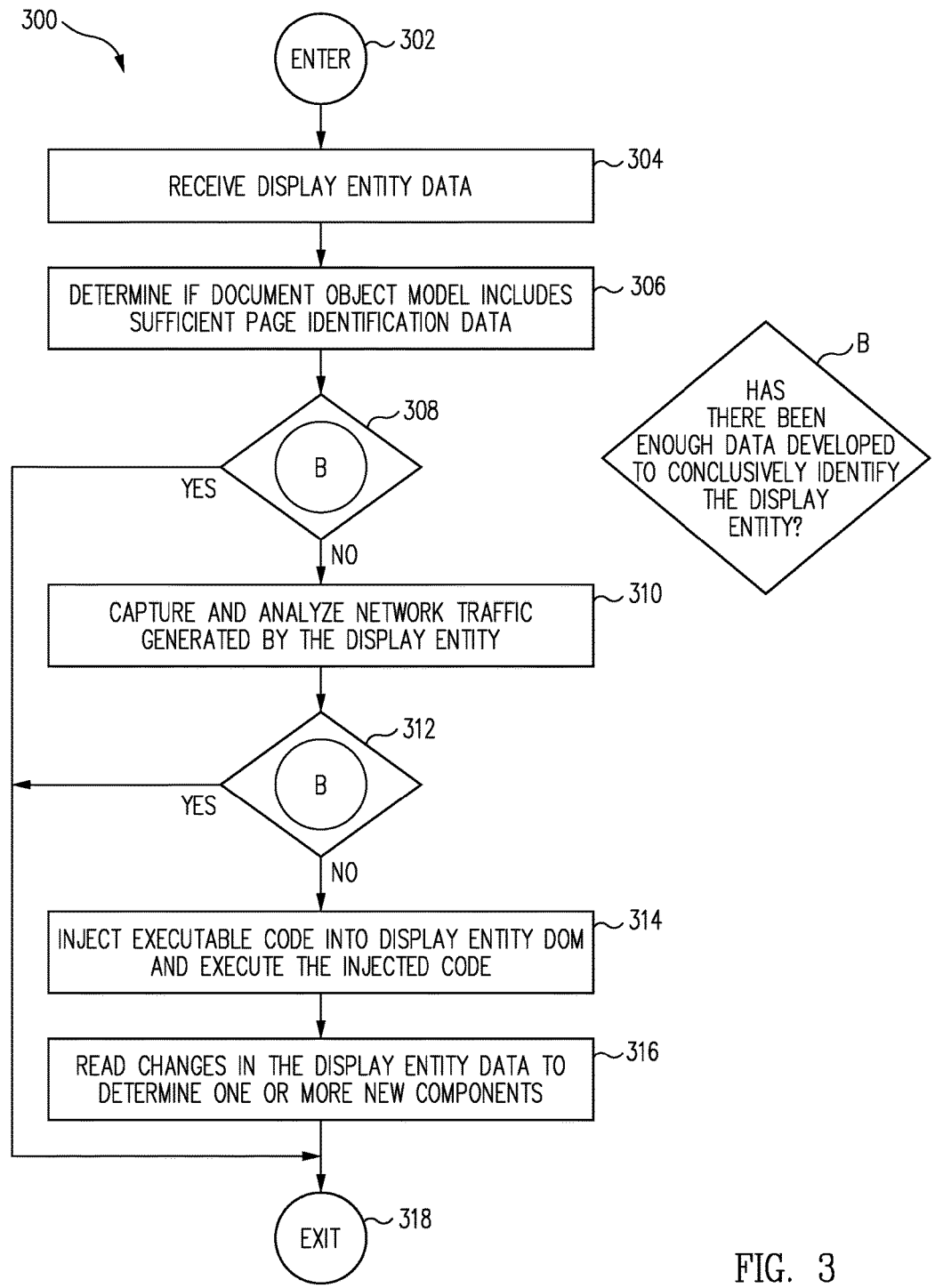
FIG. 3 is a flow chart depicting a process for identifying a display entity in accordance with one embodiment.

FIG. 3 is a flow chart depicting a process for identifying a display entity in accordance with one embodiment.

Recall that, in one embodiment, plug-in 130 of web browser 128 works together with page identifier 140 to identify a display entity, at DETERMINE DISPLAY ENTITY IDENTIFICATION FOR A DISPLAY ENTITY SELECTED BY THE USER OPERATION 206, such as a webpage or workflow page.

In one embodiment, process 300 begins at ENTER OPERATION 302 and proceeds with RECEIVE DISPLAY ENTITY DATA OPERATION 304.

In one embodiment, at RECEIVE DISPLAY ENTITY DATA OPERATION 304, display entity data, such as a webpage of a website produced by web server 146 using one or more of webpage data 148 and user specific data 152, is received at web browser 128 of computing system 102. Following receipt of the display entity data, process flow proceeds with DETERMINE IF DOCUMENT OBJECT MODEL INCLUDES SUFFICIENT PAGE IDENTIFICATION DATA OPERATION 306.

In one embodiment, identifying a webpage includes examining one or more of the webpage's uniform resource locater (URL) and DOM to determine whether one or more identity indicators are present. In one embodiment, displayable and non-displayable data associated with the webpage is analyzed and examined to determine one or more tags, such as XML tags, HTML tags, or other tags used for constructing webpages are present within the webpage's DOM that would help in identifying the webpage or workflow associated with the particular display being provided to the user.

In one embodiment, the webpage being viewed contains one or more of a unique identifier of an image, a URL or portion of a URL, a comment line indicating an origin of the webpage, a tracking identifier associated with a third party tracking service, or any other data or metadata unique to a particular webpage or workflow display.

For some websites and online applications, the URL includes enough information to identify where the user is in the application, a particular webpage they are viewing, etc. For example, if a URL includes a pathway from the domain to the exact page a user is viewing, such as http://www.a-nalytics.com/secondpage.html, the URL contains enough information to identify the webpage, e.g. secondpage.html, the user is viewing with a high level of confidence that the identified webpage is the webpage that the user is viewing.

In one embodiment, two or more pieces of data of the URL and/or DOM are used together to determine the identity of the webpage the user is currently viewing. For example, the domain name, e.g. http://www.analytics.com, is used together with a name or value of a tag, such as an xml or HTML tag, for example, found within the DOM, such as a tag "page" which contains the data "invoice."

In XML, the tag and data might be represented as invoice for example.

Many other combinations are possible, which are readily apparent to persons of skill in the art, while remaining within the scope of this disclosure.

In one embodiment, at DETERMINE IF DOCUMENT OBJECT MODEL INCLUDES SUFFICIENT PAGE IDENTIFICATION DATA OPERATION 306, the display entity data is analyzed to determine a URL or other data associated with a domain name associated with the display entity data, such as a webpage or workflow page.

In one embodiment, following a determination, at DETERMINE IF DOCUMENT OBJECT MODEL INCLUDES SUFFICIENT PAGE IDENTIFICATION DATA OPERATION 306, of a URL or other data associated with the domain name associated with the display entity, such as a webpage or workflow page, plug-in 130 provides the URL and/or domain name data to page identifier 140. Page identifier 140 then reviews, at DETERMINE IF DOCUMENT OBJECT MODEL INCLUDES SUFFICIENT PAGE IDENTIFICATION DATA OPERATION 306, available analytics data, such as a list of analytics data in a lookup table, and determines, in this example, in one embodiment, whether analytics data exists for the URL and/or domain name data provided by plug-in 130 to page identifier 140.

In one embodiment, once a determination is made at DETERMINE IF DOCUMENT OBJECT MODEL INCLUDES SUFFICIENT PAGE IDENTIFICATION DATA OPERATION 306 whether analytics data exists for the URL and/or domain name data provided by plug-in 130 to page identifier 140, a decision is made, at HAS THERE BEEN ENOUGH DATA DEVELOPED TO CONCLUSIVELY IDENTIFY THE DISPLAY ENTITY? OPERATION 308 as to whether the data developed so far with respect to the display entity, for example, is sufficient to conclusively identify the display entity and thus further determine the relevant analytics data associated with the display entity.

In one embodiment, in a first example, there is only one known set of analytics data available for a display entity, such as a website, having that domain name, with that set of analytics data being focused entirely on the domain, and not divided into separate analytics data sets according to particular specific display entities, such as particular web pages or workflow pages. In this example, plug-in 130 analyzes, at DETERMINE IF DOCUMENT OBJECT MODEL INCLUDES SUFFICIENT PAGE IDENTIFICATION DATA OPERATION 306, the domain name data and determines that there is only one set of analytics data for the entire domain, after which plug-in 130 is provided an indication that no further data is needed by page identifier 140, due to page identifier 140 having enough information to conclusively identify the domain name as being associated with the particular identified set of analytics data.

If, in one embodiment, the document object model analysis of DETERMINE IF DOCUMENT OBJECT MODEL INCLUDES SUFFICIENT PAGE IDENTIFICATION DATA OPERATION 306 resulted in enough information to conclusively identify the display entity, process flow proceeds with EXIT OPERATION 318, and process 300 ends, awaiting new data.

In a second example, in one embodiment, following a determination of a URL or other data associated with the domain name associated with the webpage or workflow, plug-in 130 sends the domain name data to page identifier 140. Page identifier 140 then reviews, at DETERMINE IF DOCUMENT OBJECT MODEL INCLUDES SUFFICIENT PAGE IDENTIFICATION DATA OPERATION 306, available analytics data, such as a list of analytics data in a lookup table, and determines, in this example, in one embodiment, that there are two or more different known sets of analytics data available for a website or workflow having that domain name, and the two different known sets of analytics data apply to different webpages associated with that domain name. In this circumstance, at HAS THERE BEEN ENOUGH DATA DEVELOPED TO CONCLUSIVELY IDENTIFY THE DISPLAY ENTITY? OPERATION 308, the answer is no, not enough data has been developed to conclusively identify the display entity sufficient to determine a set of analytics data associated with the particular display entity, and process flow proceeds with CAPTURE AND ANALYZE NETWORK TRAFFIC GENERATED BY THE DISPLAY ENTITY OPERATION 310.

Thus, responsive to an indication from page identifier 140 that additional identification indicators are needed to conclusively identify the display entity, such as the webpage or workflow page, that the user is viewing, or alternatively responsive to a lack of confirmation, after a predetermined period of time passes, by page identifier 140 that no further data is needed, plug-in 130 attempts to gather additional information regarding the particular display entity, such as a particular webpage or workflow page being viewed by the user.

In one embodiment, at CAPTURE AND ANALYZE NETWORK TRAFFIC GENERATED BY THE DISPLAY ENTITY OPERATION 310, network traffic data associated with a tracking tool is captured and analyzed to determine whether the captured network traffic contains information representative of the particular display entity, such as a webpage or workflow page being viewed by the user. In one embodiment, the captured network traffic includes one or more data items, such as a tag, for example, representative of a specific webpage, or a recognized tracking tool identifier associated with a particular display entity, such as a webpage. In one embodiment, the captured network traffic includes one or more data tags, useful to process 136 for providing contextual analytics data, that represent one or more data values used by a first tracking process, where the one or more data tag values are equivalent to known values used by second process, where the second process uses the tag to represent a known webpage or other display entity for a different purpose.

In this example, process 136 for providing contextual analytics data can use the captured network traffic associated with the display entity and compare the captured network traffic to determine whether a portion of the captured network traffic matches known data about particular display entities. If at least a portion of the captured network traffic matches known data about at least one particular display entity, and if that matching information leads to a conclusion that is consistent with a partial identification that has been made using the DOM information of DETERMINE IF DOCUMENT OBJECT MODEL INCLUDES SUFFICIENT PAGE IDENTIFICATION DATA OPERATION 306, a conclusion may properly be formed that the display entity has been conclusively identified.

Once network traffic of the display entity has been captured and analyzed, process flow proceeds with HAS THERE BEEN ENOUGH DATA DEVELOPED TO CONCLUSIVELY IDENTIFY THE DISPLAY ENTITY? OPERATION 312 essentially repeating HAS THERE BEEN ENOUGH DATA DEVELOPED TO CONCLUSIVELY IDENTIFY THE DISPLAY ENTITY? OPERATION 308.

In one embodiment, if, at HAS THERE BEEN ENOUGH DATA DEVELOPED TO CONCLUSIVELY IDENTIFY THE DISPLAY ENTITY? OPERATION 312, the captured and analyzed network traffic data, and/or data determined through an analysis of the DOM and other information of the display entity conclusively identifies the display entity the user is viewing, further identification is not necessary, and process flow proceeds with EXIT OPERATION 318, and process 300 ends, awaiting new data.

In one embodiment, if, at HAS THERE BEEN ENOUGH DATA DEVELOPED TO CONCLUSIVELY IDENTIFY THE DISPLAY ENTITY? OPERATION 312, the captured and analyzed network traffic data, and/or data determined through an analysis of the DOM and other information of the display entity does not conclusively identify the display entity the user is viewing, further identification is necessary and process flow proceeds with INJECT EXECUTABLE CODE INTO DISPLAY ENTITY DOM AND EXECUTE THE INJECTED CODE OPERATION 314.

In one example, some online applications allow the user to move from one screen to another without changing the base URL, e.g. http://www.analytics.com, often an entry point to the online application or workflow, to reflect that the user is viewing a different web page than the entry web page.

Recall that the webpage is loaded into a first virtual container, which is isolated from a second virtual container of web browser 128, and the second virtual container contains plug-in 130, for example. The first virtual container may only execute programming code that is present within the first virtual container, and the second virtual container may only execute programming code that is present within the second virtual container.

Further, in one embodiment, instructions executed within the second virtual container are restricted from directly determining or otherwise directly reading the variable names and values of program variables stored within the memory of the first virtual container, and instructions executed within the first virtual container are restricted from directly determining or otherwise directly reading the variable names and values of program variables stored within the memory of the second virtual container. However, in one embodiment, instructions executed within the second container are able to change the contents of the first container, including writing additional executable instructions into the first virtual container that are either executed automatically, or are executed responsive to a trigger, such as a particular condition being satisfied.

In one embodiment, at INJECT EXECUTABLE CODE INTO DISPLAY ENTITY DOM AND EXECUTE THE INJECTED CODE OPERATION 314, when attempting to identify the webpage, executable instructions, such as programming code represented by the JavaScript programming language, not originally present in the display entity being viewed, such as a loaded webpage or workflow page, are injected into the memory of the first virtual container. In one embodiment, plug-in 130 of the second virtual container performs the injection of the executable instructions, at INJECT EXECUTABLE CODE INTO DISPLAY ENTITY DOM AND EXECUTE THE INJECTED CODE OPERATION 314, such as programming code represented by the JavaScript programming language, into the first virtual container.

Those of ordinary skill will readily recognize that using executable instructions represented by the JavaScript programming language is exemplary, and is presented herein because the JavaScript programming language is supported by many popular web browsers, such as web browser 128 of computing system 102. Those skilled persons will further readily recognize that any other type of executable instructions represented by any suitable programming language supported by the first virtual container of the given web browser the user is using may be injected into the first virtual container to perform the desired operations disclosed herein.

In one embodiment, at INJECT EXECUTABLE CODE INTO DISPLAY ENTITY DOM AND EXECUTE THE INJECTED CODE OPERATION 314, the injected programming code includes instructions, which when executed within the first container, will determine whether one or more programming entities, such as one or more main variables, object variables or other data or function names, for example, are present in memory associated with the first virtual container. Those of ordinary skill will readily appreciate that programming objects are typically created to hold data and to provide related functions and methods that may be accessed and used. At least one function of the injected code is to expose one or more programming entities that can be used to further identify the display entity and make that data associated with those exposed programming entities available to plug-in 130.

If a determination is made, at INJECT EXECUTABLE CODE INTO DISPLAY ENTITY DOM AND EXECUTE THE INJECTED CODE OPERATION 314, that data of the one or more programming objects is present in memory, the injected instructions, in one embodiment, analyze the programming objects containing information which, standing alone or in combination with other information already accessible to process 136 for providing contextual analytics data, may be used to identify the display entity, such as a webpage or workflow page being displayed for the user.

If, at INJECT EXECUTABLE CODE INTO DISPLAY ENTITY DOM AND EXECUTE THE INJECTED CODE OPERATION 314, data of the one or more programming objects present in the memory of the first virtual container, such as a first virtual container of web browser 128, may be used to identify the display entity, such as a webpage or workflow page being displayed for the user, further ones of the injected instructions modify the DOM of the displayed entity, such as a webpage or a workflow page, to make data representative of the programming entities readable by executable instructions of the second virtual container. In one embodiment, if, at INJECT EXECUTABLE CODE INTO DISPLAY ENTITY DOM AND EXECUTE THE INJECTED CODE OPERATION 314, data of the one or more programming objects present in the memory of the first virtual container, such as a first virtual container of web browser 128, may be used to identify the display entity, such as the webpage or workflow page being displayed for the user, further ones of the injected instructions modifies the DOM of the displayed entity to reflect a value of the associated programming object. In one embodiment, the injected executable instructions insert one or more data attributes into the DOM of the display entity of the first virtual container, such as inserting a comment line or other attribute so that the new attribute may be read by the plug-in, such as plug-in 130 and a further identification of the display entity, such as a webpage or workflow of the first virtual container, may be made or enhanced.

For example, in one embodiment, assume that an authenticated user, such as a user of computing system 102, is using their web browser, such as web browser 128, to interface with an online application of computing system 106, such as Quickbooks™ Online, available from Intuit Inc. of Mountain View, Calif. Further assume that the online application causes a unique JavaScript variable to be loaded into the user's web browser whenever the user is viewing a display entity associated with the online application. By examining memory of the first virtual container, such as a first virtual container of web browser 128, and locating a known JavaScript variable that Quickbooks™ Online uses, at least a partial identification of the particular display entity may be made.

In the same example of a user of computing system 102 using their web browser 128 to interface with Quickbooks™ Online, a much simplified DOM, created just for exemplary use, associated with the display entity might look like:

```
<!DOCTYPE html>
<html>
<head>
    <meta charset="utf-8">
    <title>QuickBooks Online</title>
</head>
<body>
    <button id="mybutton">Click me</button>
</body>
</html>
```

In this example, following the injection and execution of executable code into the display entity, a JavaScript variable "page" has been located, and it's value "invoice" has been determined, after which the DOM of the display entity is modified by the injected code to read as follows, including the new construct "data-page="invoice"":

```
<!DOCTYPE html>
<html>
<head>
    <meta charset="utf-8">
    <title>QuickBooks Online</title>
</head>
<body data-page="invoice">
    <button id="mybutton">Click me</button>
</body>
</html>
```

In one embodiment, the DOM of the display entity may be read by executable instructions of the second virtual container, such as executable instructions of plug-in 130 of web browser 128.

Following completion of INJECT EXECUTABLE CODE INTO DISPLAY ENTITY DOM AND EXECUTE THE INJECTED CODE OPERATION 314, process flow proceeds with READ CHANGES IN THE DISPLAY ENTITY DATA TO DETERMINE ONE OR MORE NEW COMPONENTS OPERATION 316.

In one embodiment, at READ CHANGES IN THE DISPLAY ENTITY DATA TO DETERMINE ONE OR MORE NEW COMPONENTS OPERATION 316, the DOM of the display entity is re-examined to locate one or more new components of the DOM that were not present prior to the injection and execution of executable code into the first virtual container. In the example above, at READ CHANGES IN THE DISPLAY ENTITY DATA TO DETERMINE ONE OR MORE NEW COMPONENTS OPERATION 316, the new construct "data-page="invoice"" is determined to be new, and is further determined to be indicative of a particular display entity user of computing system 102 is viewing.

Following completion of READ CHANGES IN THE DISPLAY ENTITY DATA TO DETERMINE ONE OR MORE NEW COMPONENTS OPERATION 316, process flow proceeds with EXIT OPERATION 318, and process 300 ends, awaiting new data.

As discussed above, in one embodiment, two or more pieces of data of the URL and/or DOM are used together to determine the identity of the webpage the user is currently viewing. Correspondingly, two or more pieces of data of the URL, DOM, and JavaScript variables of the first virtual container are used together, in one embodiment, to determine the identity of the display entity the user is currently viewing.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing contextual analytics data comprising:
at least one processor; and
at least one memory coupled to the at least one processor, the at least one memory having stored therein instructions which when executed by the at least one processor, perform a process for providing contextual analytics data, the process for providing contextual analytics data comprising:
establishing a first virtual container and a second virtual container, the first virtual container isolated from a second virtual container, the isolation between the first virtual container and the second virtual container ensuring that executable instructions presented within the first virtual container are not executable by the second virtual container, the second virtual container including at least executable instructions for one or more process operations for providing contextual analytics data pertaining to data in the first virtual container;
restricting instructions executed within the second virtual container from determining varaible names and values of program variables stored within the memory of the first virtual container;
restricting instructions executed within the first virtual container from determining variable names and values of program variables stored within the memory of the second virtual container;
receiving first data at the first virtual container;
injecting, through performance of one or more process operations of the second virtual container, one or more executable instructions into the first virtual container, the injected executable instructions, when executed by the first virtual container perform:
determing that a particular predetermined data object is persent within memory of the first virtual container; and
responsive to determining that a particular predetermined data object is present within memory of the first virtual container, identifying one or more data items of the predetermined data object and adding webpage identification data to the first container representative of the particular display entity;
analyzing the first data to determine one or more characteristics of the first data identifying the first data as being representative of a particular display or display entity, wherein the executable instructions of the first data comprise at least a subset of the display or display entity;
responsive to the analysis of the first data being complete, determining that contextually relevant analytics data pertaining to the first data is available, and further determining that the avaliable contextually revelant analytics data includes a public portion and a private portion, wherein the private portion is restricted to users of computing systems within a given network;
requesting, responsive to the determination that contextually relevant analytics data pertaining to the first data is available, contextually relevant analytics data associated with the first data;
determining whether a computing system associated with the request is within a private network associated with the private portion;
receiving, responsive to the request for contextually relevant analytics data associated with the first data, contextually relevant analytics data associated with the first data, the received contextually relevant analytics data including only the public portion if the computing system associated with the request was determined to be outside the private network, the received contextually relevant analytics data including the public portion and the private portion if the computing system associated with the request is within the private network;

selectively displaying at least one icon associated with the contextually revelant analytics data, the display of the icon being presented when contextual revelant analytics data is available pertaining to a webpage currently being displayed;

if the icon is present:

receiving an activation event pertaining to the icon; and requesting, responsive to receiving an activation event pertaining to the icon, contextually revelant analystics data associated with the first data; and displaying, as display data, at least a portion of the received contextually revelant analystics data pertaining to the first data, the displayed portion being at least partly determined by predetermined preference data indicating one or more subsets of a larger set of contextually revelant analytics data desired by the user to be presented, a format of the display data also being determined using user preference data, the display data being origanally available in a first form, and converted to a second form based on the user preference data, wherein different display data originating from different data sources are displayed in different fomats according to predetermined user preference data.

2. The system for providing contextual analytics data of claim 1 wherein a characteristic of the one or more of the first data identifying the first data as being representative of a particular display entity is nondisplayable data unique to the particular display entity.

3. The system for providing contextual analytics data of claim 1 further comprising:

capturing network traffic data associated with a tracking tool activated by executed first data of the first virtual container;

analyzing the captured network traffic data to identify data representative of the particular display entity; and determining at least a portion of an identity of the particular display entity, based on the analysis of the captured network traffic data.

4. The system for providing contextual analytics data of claim 1 wherein receiving first data comprises receiving first data within a web browser application, further wherein the first and second virtual containers are execution containers of the web browser application.

5. The system for providing contextual analytics data of claim 1 wherein the first virtual container is a webpage display container of a web browser and the second virtual container is a browser extension container of the web browser.

6. The system for providing contextual analytics data of claim 1 wherein the particular display entity is a particular display entity selected from the group of particular execution entities consisting of:

a webpage;

a display page of a web application; and a web workflow.

7. The system for providing contextual analytics data of claim 1 wherein the request for the contextually relevant analytics data includes user preference data indicating particular subsets of contextually relevant analytics data to be provided and displayed from a larger full set of available contextually relevant analytics data.

8. The system for providing contextual analytics data of claim 1 wherein the display of the contextually relevant analytics data is based on user preference data indicating that only particular subsets of the received contextually relevant analytics data are to be displayed.

9. The system for providing contextual analytics data of claim 1 further comprising receiving, prior to responding to a request for contextually relevant analytics data, authentication data of a user; and validating, prior to responding to a request for contextually relevant analytics data, the authentication data as being of an authorized user.

10. The system for providing contextual analytics data of claim 9 wherein the authentication data is identification data of a computing system making the request, wherein the identification data is compared and matched with identification data of one or more authorized computing systems, prior to providing at least a portion of the contextually relevant analytics data responsive to the request.

11. The system for providing contextual analytics data of claim 9 wherein the authentication data is data specific to a particular user.

12. A computing system implemented process for providing contextual analytics data comprising:

establishing a first virtual container and a second virtual container, the first virtual container isolated from the second virtual container, the isolation between the first virtual container and the second virtual container ensuring that executable instructions presented within the first virtual container are not executable by the second virtual container, the second virtual container including at least executable instructions for one or more process operations for providing contextual analytics data pertaining to data in the first virtual container;

restricting instructions executed within the second virtual container from determining variable names and values of program variables stored within the memory of the first virtual container;

restricting instructions executed within the first virtual container from determining variable names and values of program variables stored within the memory of the second virtual container;

injecting, through performance of one or more process operations of the second virtual container, first data including one or more executable instructions into the first virtual container, the injected executable instructions, when executed by the the first container perform:

determining that a particular predetermined data object is present within memrory of the first virtual container, and responsive to determining that a particular predetermined data object is present within memory of the first virtual container, identifying one or more data items of the predetermined data object and adding webpage identification data to the first container represenative of the particular display entity;

analyzing, by a computing system processor, the webpage identification data and at least a portion of the first data to determine one or more characteristics representative of a particular display entity, wherein the executable instructions of the first data comprise at least a subset of the display entity;

responsive to the analysis, by a computing system processor, of the first data being complete, determining, by a computing system processor, that contextually relevant analytics data pertaining to the first data is available, and further determining that the available contextually revelant analytics data includes a public portion and a private portion, wherein the private portion if restricted to users of computing systems within a given network;

requesting, by a computing system processor, responsive to the determination that contextually relevant analytics data pertaining to the first data is available, contextually relevant analytics data associated with the first data;

determining whether a computing system associated with the request is within a private network associated with the private portion;

receiving, by a computing system processor, responsive to the request for contextually relevant analytics data associated with the first data, contextually relevant analytics data associated with the first data, the received contextually relevant analytics data including only the public portion if the computing system associated with the request was determined to be outside the private network, the received contextually revelant analytics data including the public portion and the private portion if the computing system associated with the request is within the private network;

selectively displaying at least one icon associated with the contextually revelant analytics data, the display of the icon being presented when contextual revelant analytics data is available pertaining to a webpage currently being displayed;

if the icon is present;
   receiving an activation event pertaining to the icon; and
   requesting, responsive to receiving an activation event pertaining to the icon, contextually revelant analytics data associated with the first data; and displaying, as display data by a computing system processor, at least a portion of the received contextually relevant analytics data pertaining to the first data, the displayed portion being at least partly determined by predetermined preference data indicating one or more subsets of a lager set of contextually revelant analytics data desired by the user to be presented, a format of the the display data also being determined using user preference data, the display data being originally available in a first form, and covereted to a second form based on the user preference data, wherein different display data originating from different data sources are displayed in different formats according to predetermined user preference data.

13. The computing system implemented process for providing contextual analytics data of claim 12 wherein a characteristic of the one or more of the first data identifying the first data as being representative of a particular display entity is nondisplayable data unique to the particular display entity.

14. The computing system implemented process for providing contextual analytics data of claim 12 further comprising:
   capturing, by a computing system processor, network traffic data associated with a tracking tool activated by executed first data of the first virtual container;
   analyzing, by a computing system processor, the captured network traffic data to identify data representative of the particular display entity; and
   determining, by a computing system processor, at least a portion of an identity of the particular display entity, based on the analysis of the captured network traffic data.

15. The computing system implemented process for providing contextual analytics data of claim 12 wherein receiving, by a computing system processor, first data comprises receiving, by a computing system processor, first data within a web browser application, further wherein the first and second virtual containers are execution containers of the web browser application.

16. The computing system implemented process for providing contextual analytics data of claim 12 wherein the first virtual container is a web page display container of a web browser and the second virtual container is a browser extension container of the web browser.

17. The computing system implemented process for providing contextual analytics data of claim 12 wherein the particular display entity is a particular display entity selected from the group of particular execution entities consisting of:
   a web page;
   a display page of a web application; and
   a web workflow.

18. The computing system implemented process for providing contextual analytics data of claim 12 wherein the request for the contextually relevant analytics data includes user preference data indicating particular subsets of contextually relevant analytics data to be provided and displayed from a larger full set of available contextually relevant analytics data.

19. The computing system implemented process for providing contextual analytics data of claim 12 wherein the display of the contextually relevant analytics data is based on user preference data indicating that only particular subsets of the received contextually relevant analytics data are to be displayed.

20. The computing system implemented process for providing contextual analytics data of claim 12 further comprising receiving, by a computing system processor, prior to responding to a request for contextually relevant analytics data, authentication data of a user; and
   validating, by a computing system processor, prior to responding to a request for contextually relevant analytics data, the authentication data as being of an authorized user.

21. The computing system implemented process for providing contextual analytics data of claim 20 wherein the authentication data is identification data of a computing method making the request, wherein the identification data is compared and matched with identification data of one or more authorized computing methods, prior to providing at least a portion of the contextually relevant analytics data responsive to the request.

22. The computing system implemented process for providing contextual analytics data of claim 20 wherein the authentication data is data specific to a particular user.

23. A system for providing contextual analytics data comprising:
   a party computing system under the control of a party;
   a server computing system coupled to the party computing system through a network;
   one or more processors coupled to one or more memories, the one or more memories having stored therein instructions which when executed by the one or more processors, perform a process for providing contextual analytics data, the process for providing contextual analytics data comprising:
   establishing a first virtual container and a second virtual container, the first virtual container isolated from the second virtual container, the isolation between the first virtual container and the second virtual container ensuring that executable instructions presented within the first virtual container are not executable by the second virtual container, the second virtual container including at least executable instructions for one or more process operations for providing contextual analytics data pertaining to data in the first virtual container;

restricting instructions executed within the second virtual container from determining variable names and values of program variables stored within the memory of the first virtual container;

restricting instructions executed within the first virtual container from determining variable names and values of program variables stored within the memory of the second virtual container;

receiving, at the party computing system, first data;

injecting, through performance of one or more process operations of the second virtual container, one or more executable instructions into the first virtual container, the injected executable instructions, when executed by the first virtual container perform:

determining that a particular predetermined data object is present within memory of the first virtual container; and responsive to determining that a particular predetermined data object is present within memory of the first virtual container, identifying one or more data items of the predetermined data object and adding webpage identification data to the first container representative of the particular display entity;

analyzing, at the party computing system, the first data to determine one or more characteristics of the first data identifying the first data as being representative of a particular display entity, wherein the executable instructions of the first data comprise at least a subset of the display entity;

responsive to the analysis, at the party computing system, of the first data being complete, determining, by a computing system processor, that contextually relevant analytics data pertaining to the first data is available, and further determining that the available contextually relevant analytics data includes a public portion and a private portion, wherein the private portion is restricted to users of computing systems within a given network;

requesting, by the party computing system of the server computing system, responsive to the determination that contextually relevant analytics data pertaining to the first data is available, contextually relevant analytics data associated with the first data;

determining whether a computing system associated with the request is within a private network associated with the private portion;

receiving, by the party computing system of the server computing system, responsive to the request for contextually relevant analytics data associated with the first data, contextually relevant analytics data associated with the first data, the received contextually relevant analytics data including only the public portion if the computing system assocciated with the request was determined to be outside the private network, the received contextually relevant analytics data including the public portion and the private portion if the computing system associated with the request is within the private network;

selectively displaying at least one icon associated with the contextually relevant analytics data, the display of the icon being presented when contextual relevant analytics data is available pertaining to a webpage currently being displayed;

if the icon is present:

receiving an activation event pertaining to the icon; and requesting, responsive to receiving an activation event pertaining to the icon, contextually relevant analytics data associated with the first data; and displaying, as display data by the party computing system, at least a portion of the received contextually relevant analytics data pertaining to the first data, the displayed portion being at least partly determined by predetermined preference data indicating one or more subsets of a larger set of contextually relevant analytics data desired by the user to be presented, a format of the display data also being determined using user preference data, the display data being originally available in a first form, and converted to a second form based on the user preference data, wherein different display data originating from different data sources are displayed in different formats according to predetermined user preference data.

24. The system for providing contextual analytics data of claim 23 wherein a characteristic of the one or more of the first data identifying the first data as being representative of a particular display entity is nondisplayable data unique to the particular display entity.

25. The system for providing contextual analytics data of claim 23 further comprising:

capturing, by the party computing system, network traffic data associated with a tracking tool activated by executed first data of the first virtual container;

analyzing, by the party computing system, the captured network traffic data to identify data representative of the particular display entity; and determining, by the party computing system, at least a portion of an identity of the particular display entity, based on the analysis of the captured network traffic data.

26. The system for providing contextual analytics data of claim 23 wherein receiving, by the party computing system, first data comprises receiving, by the party computing system, first data within a web browser application, further wherein the first and second virtual containers are execution containers of the web browser application.

27. The system for providing contextual analytics data of claim 23 wherein the first virtual container is a web page display container of a web browser and the second virtual container is a browser extension container of the web browser.

28. The system for providing contextual analytics data of claim 23 wherein the particular display entity is a particular display entity selected from the group of particular execution entities consisting of:

a web page;
    a display page of a web application; and
    a web workflow.

29. The system for providing contextual analytics data of claim 23 wherein the request for the contextually relevant analytics data includes user preference data indicating particular subsets of contextually relevant analytics data to be provided and displayed from a larger full set of available contextually relevant analytics data.

30. The system for providing contextual analytics data of claim 23 wherein the display of the contextually relevant analytics data is based on user preference data indicating that only particular subsets of the received contextually relevant analytics data are to be displayed.

31. The system for providing contextual analytics data of claim 23 further comprising receiving, by the party computing system, prior to responding to a request for contextually relevant analytics data, authentication data of a user; and vailidating, by the party computing system, prior to responding to a request for contextually relevant analytics data, the authenication as being of an authorized user.

32. The system for providing contextual analytics data of claim 31 wherein the authentication data is identification data of a computing method making the request, wherein the identification data is compared and matched with identification data of one or more authorized computing methods, prior to providing at least a portion of the contextually relevant analytics data responsive to the request.

33. The system for providing contextual analytics data of claim 31 wherein the authentication data is data specific to a particular user.

\* \* \* \* \*